Dec. 5, 1939.  W. H. MUSSEY  2,181,908
CAR TRUCK
Filed April 10, 1934   5 Sheets-Sheet 1

Inventor
William H. Mussey
By Gilson, Mann & Co.
Attys.

Dec. 5, 1939.   W. H. MUSSEY   2,181,908
CAR TRUCK
Filed April 10, 1934   5 Sheets-Sheet 2
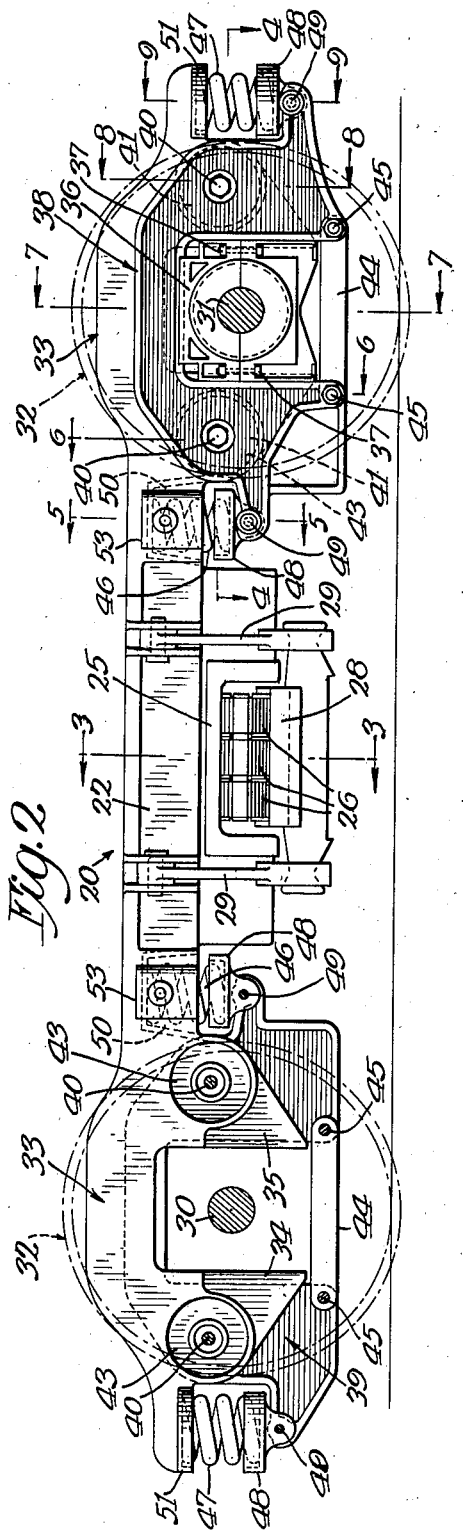
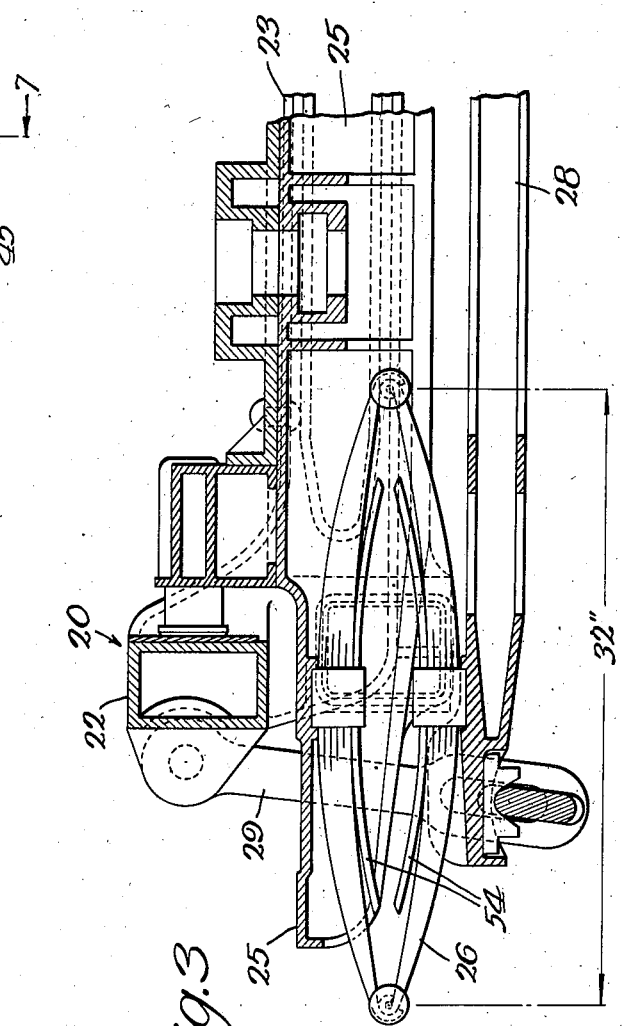
Inventor
William H. Mussey
By Gilson, Mann & Co
Attys.

Dec. 5, 1939.                W. H. MUSSEY                2,181,908
                              CAR TRUCK
                    Filed April 10, 1934          5 Sheets-Sheet 3
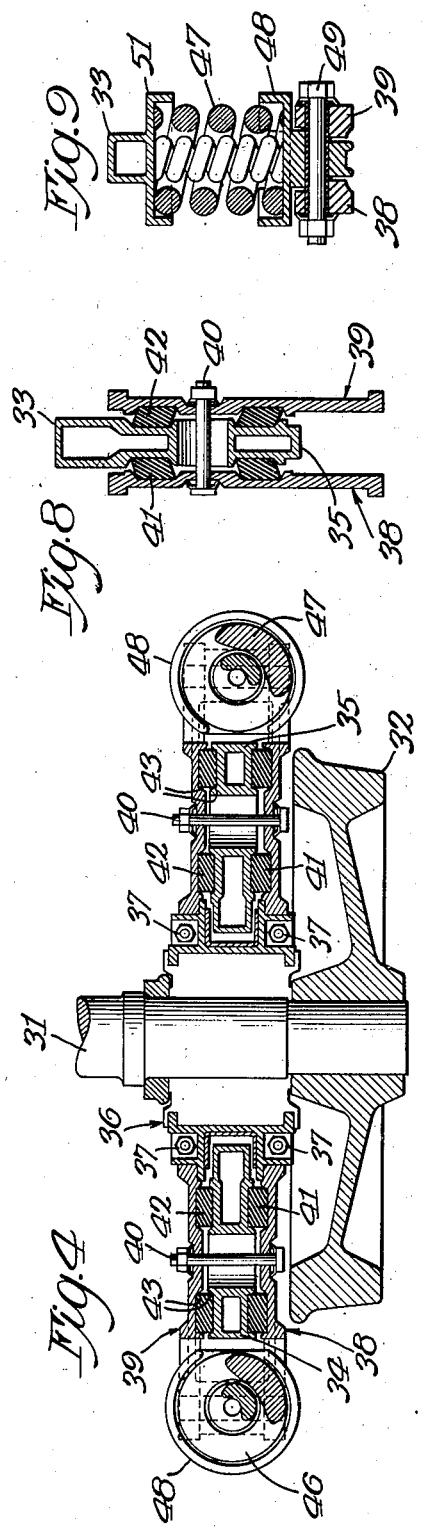
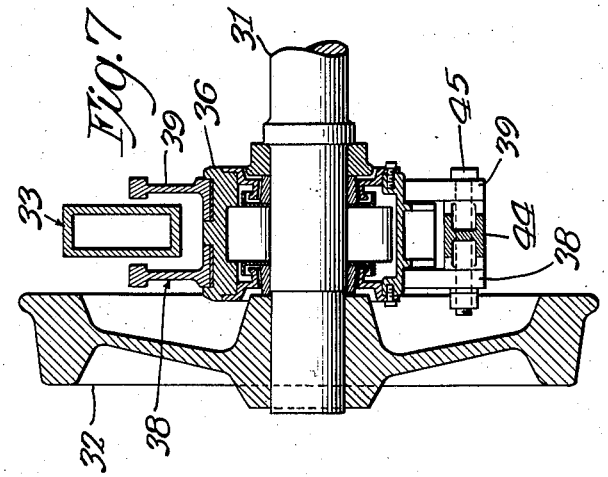
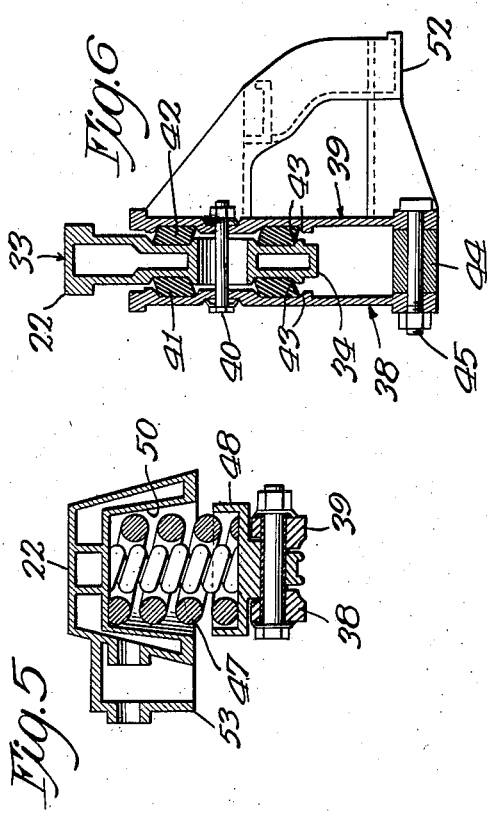
Inventor:
William H. Mussey
By Gielow, Mann & Gttys.

Dec. 5, 1939.      W. H. MUSSEY      2,181,908
CAR TRUCK
Filed April 10, 1934      5 Sheets-Sheet 4
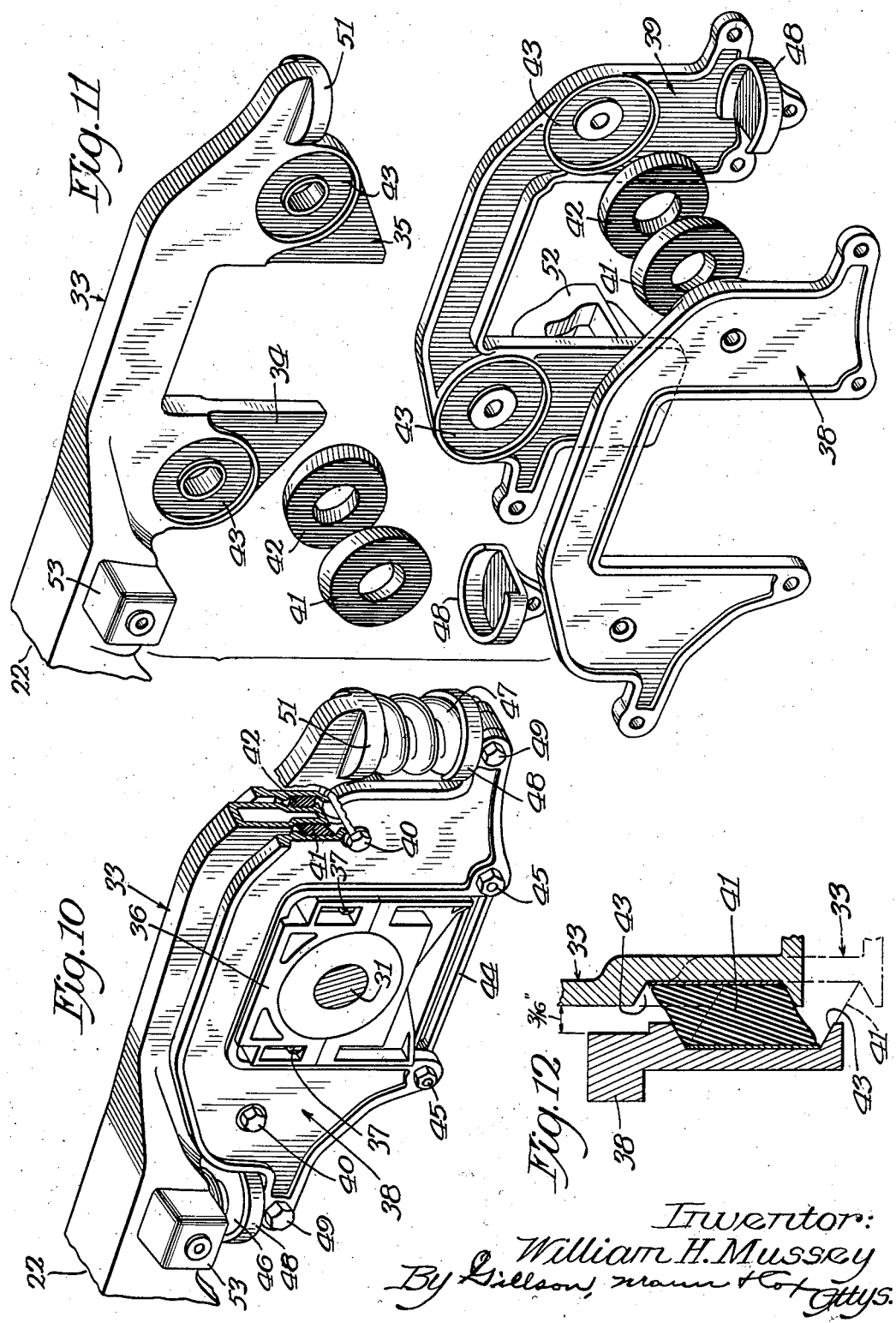
Inventor:
William H. Mussey
By Gillson, Mann &Co
Attys.

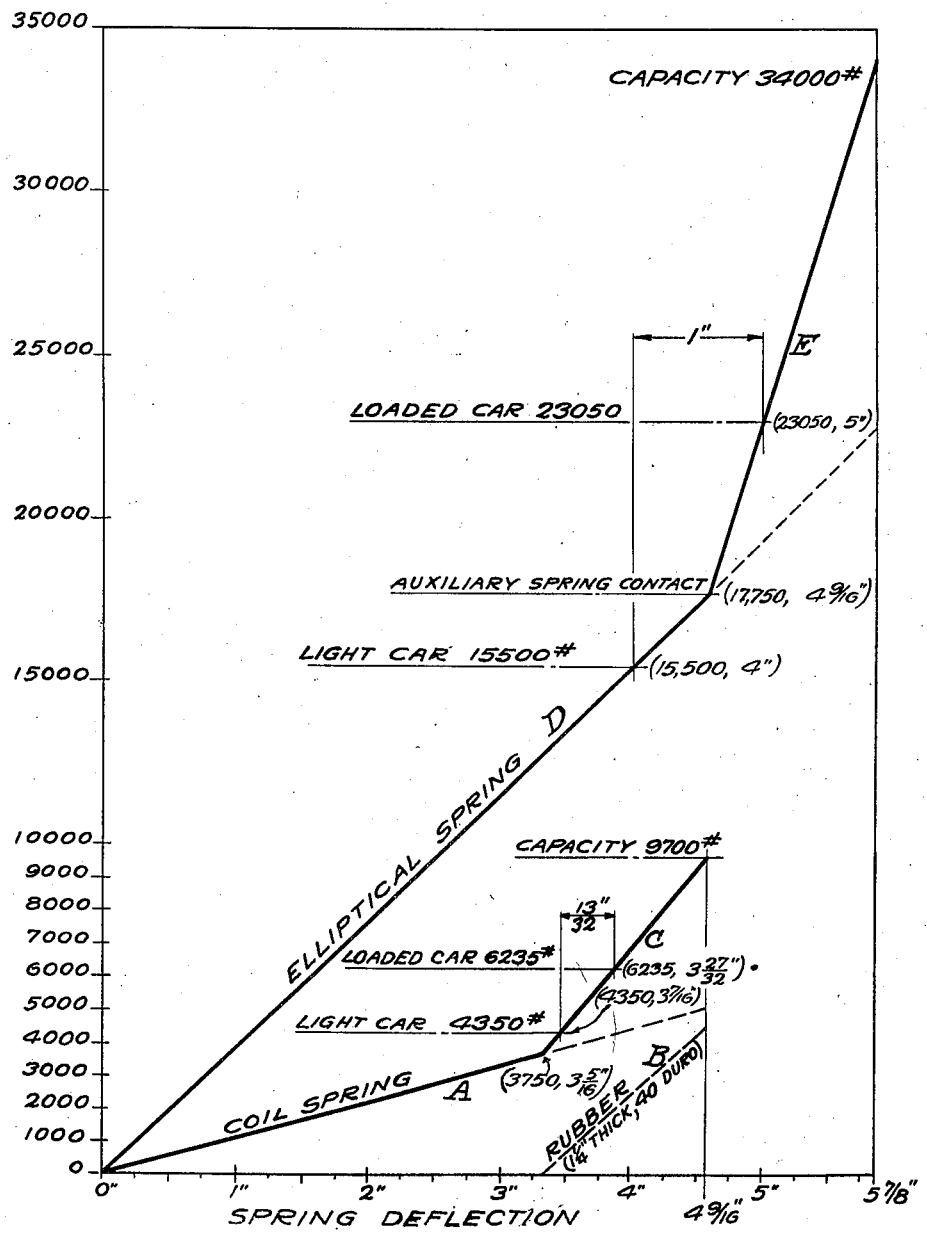

Patented Dec. 5, 1939

2,181,908

UNITED STATES PATENT OFFICE 2,181,908

CAR TRUCK

William H. Mussey, Chicago, Ill., assignor to Pullman-Standard Car Manufacturing Company, Chicago, Ill., a corporation of Delaware Application April 10, 1934, Serial No. 719,881

17 Claims. (Cl. 105—182)

The principal object of this invention is to provide a car truck that has improved riding qualities and longer life, all at a minimum of cost.

Further and other objects and advantages will become apparent as the disclosure proceeds, and the description is read in conjunction with the accompanying drawings, in which Fig. 1 is a plan view of a car truck made in accordance with this invention;

Fig. 2 is a side, elevational view of the truck.

Fig. 3 is a fragmentary, sectional view taken on the line 3—3 of Fig. 2;

Fig. 4 is a horizontal, sectional view taken on the line 4—4 of Fig. 2;

Fig. 5 is a vertical, sectional view through the inner coil spring, the section being taken on the line 5—5 of Fig. 2;

Fig. 6 is a vertical, sectional view taken on the line 6—6 of Fig. 2;

Fig. 7 is a vertical, sectional view taken on the line 7—7 of Fig. 2, the axle being shown in elevation;

Fig. 8 is a vertical, sectional view taken on the line 8—8 of Fig. 2;

Fig. 9 is a vertical, sectional view taken through the outer coil spring, the section being taken on the line 9—9 of Fig. 2;

Fig. 10 is a fragmentary, perspective view showing one of the pedestal arms in assembled relation;

Fig. 11 is an exploded, perspective view showing the various parts of the pedestal assembly in disassociated relation;

Fig. 12 is a fragmentary, sectional view through the lower portion of one of the rubber annuli, the dotted lines indicating the limit of relative movement between the pedestal arm and the yoke castings; and Fig. 13 is a diagram giving a specific illustration of the relationship between the elliptical springs and the rubber and coil springs.

Figure 1:
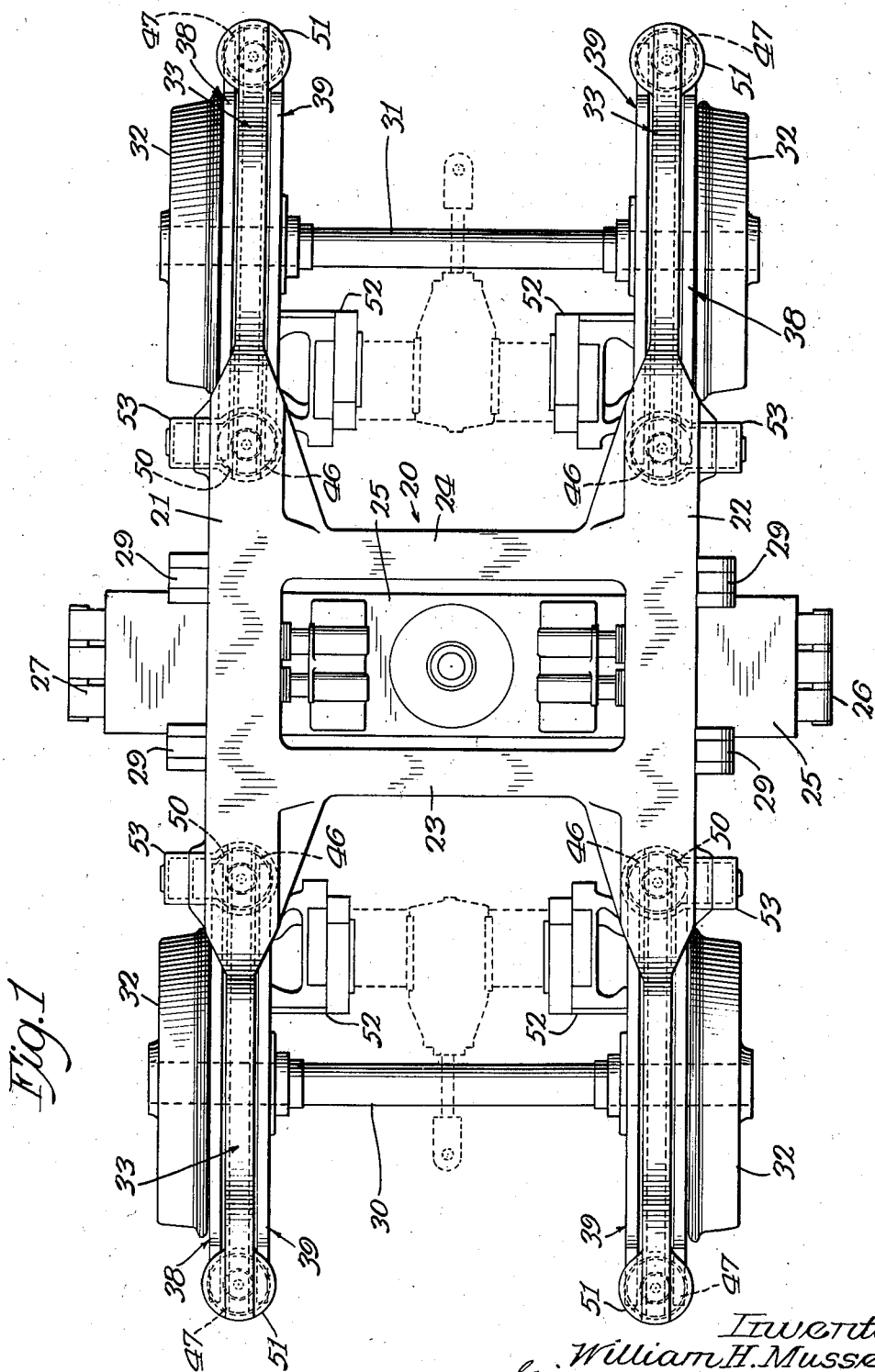

The choice of a particular embodiment of the invention for illustration and description is for the purpose of disclosure only and the appended claims are to be construed accordingly.

The truck, generally designated 20, comprises side frames 21 and 22 which are joined together by transoms 23 and 24. The truck frame supports a bolster 25 resting upon elliptical springs 26 and 27 carried on a spring plank 28 suspended by swing hangers 29 from the side frames. The truck frame is mounted on wheeled axles 30 and 31, the wheels being indicated at 32.

Both side frames 21 and 22 are equipped at their ends with pedestal arms generally designated 33 each of which has legs 34 and 35 which sit astride a journal box 36 just inside of the adjacent wheel. The journal box is made in two pieces to facilitate assembly and bolts 37 hold the parts together. The journal itself is conventional and need not be described.

A pair of yoke castings 38 and 39 rest upon the journal box on opposite sides of the pedestal arm and support the arm in spaced relation to the journal box, as shown in Figs. 7 and 10 by bolts 40 which clamp rubber annuli 41 and 42 between the legs of the pedestal arm and the inside face of the yoke castings. The inner faces of the yoke castings and both faces of the pedestal arm are provided with recesses 43 for receiving the rubber annuli and holding them in place.

The yoke castings constitute in effect a projection on the journal box which cooperate, through the rubber annuli, with the truck frame in supporting the latter from the car axles and in resisting lateral movement of the truck frame relative to the axles.

A tie bar 44 is secured by bolts 45 across the legs of the yoke castings and holds the castings on the journal box.

Coil springs 46 and 47 assist the rubber annuli in supporting the pedestal arm on the journal box. The springs rest upon seats 48 which are pivoted by bolts 49 between the yoke castings. The upper end of the spring 46 enters a recess 50 in the pedestal arm (Fig. 5) and the spring 47 engages an overhanging enlargement 51 at the end of the pedestal arm.

The inner yoke casting 39 has a wing extension 52 for supporting a brake cylinder as shown in dotted lines in Fig. 1. The protuberances 53 on the side frames adjacent the pedestal arms are for the brake hangers (not shown).

There are several important advantages to be gained by supporting the truck frame in the manner indicated. In the first place, it is desirable to have rubber carry the dynamic load because rubber acts quickly and is, therefore, capable of absorbing sharp impacts. Coil springs have greater inertia than rubber springs and if used alone, they would have to be considerably heavier than those used in combination with rubber. Consequently when coil springs are used alone, there is a greater tendency for quick blows to be transmitted to the truck frame than when they are used in conjunction with rubber.

Stated in other words, coil springs used in combination with rubber may be relatively soft and, therefore, comparatively quick acting while if used alone, they must be relatively stiff to support the load, and consequently have a greater tendency to transmit shock.

While it is desirable to employ rubber for carrying the dynamic load, it is equally important to have the static load on the rubber if any but a small percentage of its total capacity. The reason for this is that rubber has the property of taking a permanent set when it is required to carry static loads of any relative consequence. This situation is met in the present invention by using coil springs to relieve the rubber of the greater part of the static load, but allowing the rubber to come into action for the dynamic load. The coil springs are preferably of the double coil type.

The coaction of the rubber annuli and the coil springs in absorbing the load carried by the truck is best illustrated in the graphical representation of Fig. 13.

As a specific illustration, let it be assumed that the weight carried by each set (2) of rubber annuli and the associated coil spring is 4350 lbs. when the car is unloaded, and 6235 lbs. when loaded. For these conditions, the coil springs are preferably of such size and resilience that they will be compressed solid under a load of 9700 lbs. (when used in combination with rubber annuli in the manner described) and have a total deflection of $4\frac{3}{16}$ inches from a zero load. Also, let it be assumed for these conditions that the rubber annuli are 1¼ inches thick; that they have a total deflection of 1¼ inches; that they have a durometer reading of 40; and that they are arranged so that they do not come into play until the coil springs have been deflected approximately $3\frac{5}{16}$ inches under a load of 3750 lbs.

It will be understood by reference to Fig. 13 that the $3\frac{5}{16}$" deflection of the coil spring prior to the rubber coming into action takes place during the assemblage of the truck, i. e. the truck frame is allowed to seat upon the coil springs and compress them prior to inserting the rubber annuli between the yokes and the truck frame. In use, the coil springs and rubber annuli are working in parallel, as clearly indicated in the diagram of Fig. 13.

These assumed conditions are indicated on Fig. 13 and the curve A represents the load deflection characteristics of the coil spring; the curve B, the same characteristics of the two rubber annuli; and the curve C, the load deflection characteristics of the coil spring and rubber annuli acting together.

It will first be observed that the static load under the conditions stated is borne chiefly by the coil spring and only to a small extent by the rubber springs, for the static load produces a deflection in the rubber to the extent of only nine sixty-fourths of an inch, more or less. The static load on the rubber annuli is, therefore, small in proportion to the capacity of the rubber, and under these circumstances, the rubber will stand up satisfactorily in service.

The diagram in Fig. 13 further indicates that the major part of the dynamic load is carried by the rubber annuli since the load carried by the rubber per increment of spring deflection is considerably greater than it is for the coil spring. Again, this relationship is desirable because rubber can absorb quick acting dynamic loads which a coil spring, acting alone, would transmit. Such loads are produced when a train is travelling at high speed over poor rail joints.

Since the rubber annuli and the coil springs are arranged in parallel and have different periods of vibration, there is no tendency for the impacts of rail joints to build up a resonant oscillation or vibration in the springs. The result is somewhat of a snubbing effect which makes for better riding qualities.

The elliptical springs 26 and 27 are selected so that their periods are different from the periods of the coil springs and the rubber annuli, and, consequently, there is no opportunity for vibrations to build up because of resonance between these spring units. The curves D and E in Fig. 13 give characteristics for an elliptical spring that is suitable for use with coil and rubber springs having the characteristics already stated. As shown in Fig. 13, each elliptical spring is designed to carry a light car load of 15,500 lbs. at 4 inch deflection and a loaded car load of 23,050 lbs. at 5 inch deflection with an auxiliary spring 54 coming into play at a load of approximately 17,750 lbs. and $4\frac{7}{16}$ inches deflection, making a total capacity of the elliptical spring with its auxiliary 34,000 lbs.

The mounting of the rubber annuli is such that vertical loads are absorbed by the rubber through shear, but the annuli also serve to cushion lateral forces being placed in compression, as for example when the train is rounding a curve. A clearance of at least $\frac{3}{16}$ of an inch is preferably provided between the wing casting and pedestal arm to allow for this compression.

Further details of specification for the conditions indicated in Fig. 13 are given below:

Coil springs

Outer coil 7" O. D. x $10\frac{11}{16}$" x $\frac{29}{32}$" diameter bar.
Inner coil 5" O. D. x $10\frac{11}{16}$" x $\frac{21}{32}$" diameter bar.
Solid height both springs 6⅛".
Capacity 5175 lbs.

Rubber annuli

Each annulus 9" O. D. x 4" I. D. x 1¼" thick.
Rubber subjected to lateral pressure of 40 to 50 lbs. per square inch when clamped in permanent position on the truck.

Elliptical spring

Triple grouping.
Main spring 5 plates 4" x ⅝"
Auxiliary spring 1 plate 4" x $\frac{7}{16}$"
Solid height 6⅛"
Length center to center 32 inches when loaded.

What I claim is:

1. In combination with a car truck, a truck frame including a side frame having upstanding arms, a journal box, a pair of opposed yokes supported on the journal box and receiving a pedestal arm of the side frame between their inner faces, rubber pads interposed between said faces and the pedestal arm, means for clamping the yokes together to place the pads under an initial compression, said pads being in shear under load, and means for relieving the pads of a substantial portion of the dead load shearing stress.

2. In combination with a car truck, a truck frame including a side frame having upstanding arms, a journal box, a pair of opposed yokes supported on the journal box and receiving a pedestal arm of the side frame between their inner faces, rubber pads interposed between said faces and the pedestal arm, means for clamping the yokes together to place the pads under an initial compression, said pads being in shear under load, and resilient means for relieving the pads of a substantial portion of the dead load shearing stress.

3. In combination with a car truck, a truck frame including a side frame having upstanding arms, a journal box, a pair of opposed yokes supported on the journal box and receiving a pedestal arm of the side frame between their inner faces, rubber pads interposed between said faces and the pedestal arm, means for clamping the yokes together to place the pads under an initial compression, said pads being in shear under load, and means for relieving the pads of a substantial portion of the dead load shearing stress, said last named means including a coil spring.

4. In combination with a car truck having wheeled axles, a truck frame resiliently mounted on the axles with rubber under shear, and means for relieving the rubber of a substantial portion of the dead load shearing stress.

5. In combination with a car truck having wheeled axles, a truck frame resiliently mounted on the axles with rubber under shear, and coil springs interposed between the axles and the frame for relieving the rubber of a substantial part of the dead load.

6. In combination with a car truck having wheeled axles, a truck frame mounted on the axles, and resilient means interposed between the axles and the frame including rubber under shear and coil springs, said means being arranged so that the springs carry the major portion of the dead load and the rubber a major portion of the live load.

7. In a car truck, a truck frame, wheeled axles supporting the frame, and resilient means interposed between the frame and the axles for cushioning shocks imparted to the axles, said means including coil and rubber springs arranged so that the static load is borne principally by the coil springs and the dynamic load principally by the rubber springs, the rubber springs being arranged to act in shear.

8. In a car truck, wheeled axles, a pair of opposed yokes, supported from said axles in spaced relation, a side frame between said yokes, spring seats at the ends of said yokes, means for rigidly connecting said seats and yokes together, resilient means for supporting said side frame from said yokes, said means including springs engaging said seats, and other resilient means interposed between the frame and the two yokes for cushioning lateral movement of the frame relative to the yokes.

9. In a car truck, wheeled axles, a pair of yokes supported on said axles, a side frame having depending arms at opposite sides of said axles, resilient elements between the ends of said yokes and said side frame, the opposing faces of said frame and yokes being provided with recesses, rubber members seated in said recesses, and means for clamping said frame and yokes against said rubber members, said resilient elements being of sufficient capacity to take a substantial portion of the static load from the rubber members.

10. In a car truck, a truck frame, wheeled axles supporting the frame through bearing means, a projection associated with the bearing means presenting a vertical face opposed to a vertical face on the truck frame, and resilient means interposed between the frame and the projection for cushioning shocks in a substantially vertical plane imparted by the axles, said means including coil springs in parallel with rubber springs, said rubber springs being positioned between said opposed vertical faces of the truck frame and projection.

11. In combination, a supporting member and a supported member, one of which is subject to a live load, means for carrying the supported member on the supporting member, said means including rubber arranged to act in vertical shear to resist live vertical loads and in horizontal shear to resist horizontal live loads, and means for relieving the rubber of substantially all vertical shearing stress dead load whereby the rubber maintains its original elasticity and load absorbing characteristics over relatively long periods of time.

12. In combination, a supporting member and a supported member, one of which is subject to a live load, means for carrying the supported member on the supporting member, said means including horizontally opposed relatively movable faces, one on each of said members, a block of rubber interposed between said faces and arranged to act in vertical shear to resist live vertical loads and in horizontal shear to resist horizontal live loads, and means for relieving the rubber of substantially all vertical shearing stress dead load whereby the rubber maintains its original elasticity and load absorbing characteristics over relatively long periods of time.

13. In combination, a supporting member and a supported member, one of which is subject to a live load, means for carrying the supported member on the supporting member, said means including horizontally opposed relatively movable faces, one on each of said members, a block of rubber interposed between said faces and arranged to act in vertical shear to resist live vertical loads and in horizontal shear to resist horizontal live loads, means for drawing the faces together to place the rubber under lateral compression, and means for relieving the rubber of substantially all vertical shearing stress dead load whereby the rubber maintains its original elasticity and load absorbing characteristics over relatively long periods of time.

14. In combination, a supporting member and a supported member, one of which is subject to a live load, means for carrying the supported member on the supporting member, said means including horizontally opposed relatively movable faces, one on each of said members, the faces being relatively movable through substantial distances in an up and down direction and being urged to said movement by the application of the live load, rubber operatively positioned between the faces to yieldingly resist in vertical shear the relative up and down movement and means for relieving the rubber of substantially all shearing stress dead load whereby the rubber maintains its original elasticity and load absorbing characteristics over relatively long periods of time, the relative movement of said faces in a vertical direction being substantially equal to the relative movement between the supported and supporting members.

15. In combination, a supporting member and a supported member, one of which is subject to a live load, means for carrying the supported member on the supporting member, said means including horizontally opposed relatively movable faces, one on each of said members, the faces being relatively movable through substantial distances in an up and down direction, the live load being applied to said members in such a way that substantially all of said live load applied to the members tends to produce said relative up and down movement, rubber operatively positioned between the faces to yieldingly resist in vertical shear the relative up and down movement, and means for relieving the rubber of substantially all shearing stress dead load, whereby the rubber maintains its original elasticity and load absorbing characteristics over relatively long periods of time, the relative movement of said faces in a vertical direction being substantially equal to the relative movement between the supported and supporting members.

16. In combination with a car truck having wheeled axles, a truck frame resiliently mounted on the axles with rubber under shear, and means for relieving the rubber of substantially all of the dead load shearing stress.

17. In combination with a car truck having wheeled axles, a truck frame resiliently mounted on the axles with rubber under shear, and means for relieving the rubber of a substantial portion of the vertically acting dead load shearing stress, said rubber being arranged to resist in shear relative movement of the axles and truck frame in a direction parallel to the longitudinal axis of the truck.

WILLIAM H. MUSSEY.